United States Patent

[11] 3,596,020

| [72] | Inventor | Jack L. Warren<br>P. O. Box 5784, Reno, Nev. 89503 |
|---|---|---|
| [21] | Appl. No. | 849,618 |
| [22] | Filed | Aug. 11, 1969 |
| [45] | Patented | July 27, 1971 |

[54] SWITCHING DEVICE FOR OPERATING WARNING SIGNAL LAMPS IN A MOTOR VEHICLE
3 Claims, 11 Drawing Figs.

[52] U.S. Cl. .................................................. 200/61.89,
340/66
[51] Int. Cl. .................................................. H01h 3/14
[50] Field of Search ........................................... 340/66, 71;
200/61.89, 61.9, 86.5

[56] References Cited
UNITED STATES PATENTS

| 2,678,978 | 5/1954 | Reynolds ..................... | 340/66 X |
| 2,685,006 | 7/1954 | Miller .......................... | 200/61.89 |
| 2,926,224 | 2/1960 | Sutton ......................... | 200/61.89 |
| 3,286,056 | 11/1966 | Spong ......................... | 200/61.89 |

*Primary Examiner*—Robert K. Schaefer
*Assistant Examiner*—M. Ginsburg

ABSTRACT: A switching device is disclosed which includes a housing mounted on the accelerator rod or another part of an accelerator system of a motor vehicle. The housing encompasses switching elements which are operative in response to the change in direction of the pressure on the accelerator by the foot of the operator. The switching elements operate an indicator device at the rear of the vehicle to alert a driver in a trailing vehicle that the pressure on the accelerator pedal is either being advanced for greater speed, backed off for even speed or the foot entirely removed therefrom.

PATENTED JUL 27 1971

INVENTOR.
Jack L. Warren
BY P.O. Box 5784
Reno, Nevada 89503

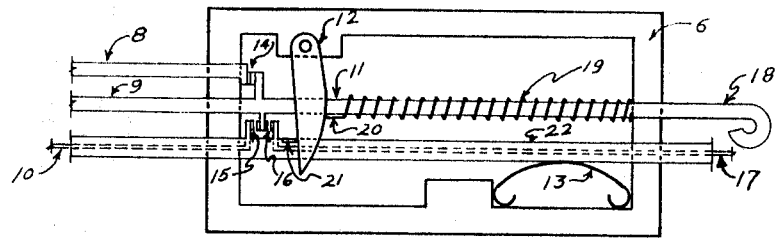
FIG. 4
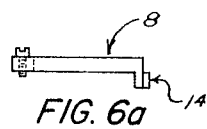
FIG. 6a
FIG. 6b
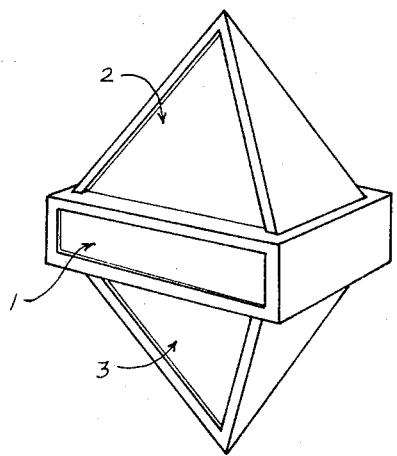
FIG. 3
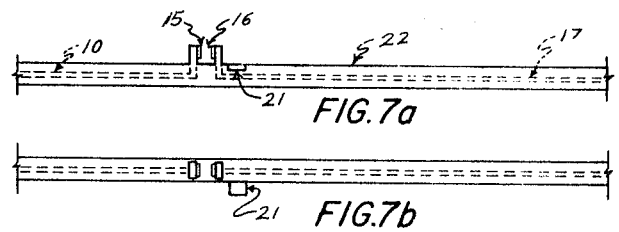
FIG. 7a
FIG. 7b
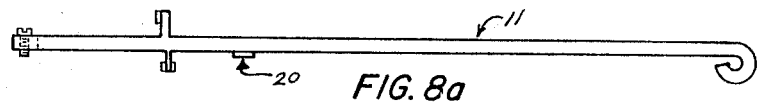
FIG. 8a
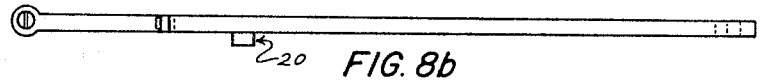
FIG. 8b
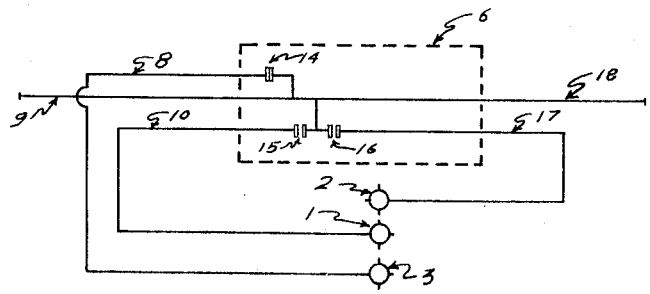
FIG. 5
INVENTOR.
BY Jack L. Warren
P.O. Box 5784
Reno, Nevada
89503

SWITCHING DEVICE FOR OPERATING WARNING SIGNAL LAMPS IN A MOTOR VEHICLE

This invention relates to a signaling and warning device for automobiles, trucks, motorcycles, trailer houses and like vehicles and more particularly an automatic signal system for signaling to drivers of other vehicles the mechanics of acceleration or deceleration and intent of operator of vehicle.

Heretofore it has been the practice to make the stoplights at the rear of an automobile, or vehicle, responsive to its brake pedal; and the stoplights are energized only after the brake pedal has been depressed a predetermined amount. Therefore, before the driver in a trailing vehicle is alerted by the stoplights at the rear of the preceding vehicle, some distinct functions must have already been performed unknown to the driver of the trailing vehicle, namely the driver of the leading vehicle must have quit accelerating, removed his foot from the accelerator pedal and depressed the brake pedal far enough to actuate the vehicle's stoplights. Hence, before any signal has been given to the operator of the trailing vehicle the vehicle in front has already begun to stop. There is, therefore, a serious time loss implicating the braking action of the trailing vehicle. THis over and above normal reactionary time loss. This is due to the lack of information.

A more specific object of this invention is to provide a signal and warning device, which is operative automatically to actuate and inform the operator of the trailing vehicle each and every movement of the accelerator pedal and rod of the preceding vehicle which will essentially eliminate the time lapse or loss between the time a preceding vehicle starts to decelerate and until the brake lights are illuminated.

The parts of my invention consist of a three-cell signal lamp mounted on the rear trunk lid on any given motor vehicle, held in posture with metal support bracket with wiring extending from same to actuating switch, mounted on accelerator rod or another part of the accelerator system.

Other objects of the invention will be apparent hereinafter from the specification and from the recital of the appended claims, particularly when read in conjunction with the accompanying drawings and in which:

FIG. 3 is an isometric view showing the general configuration of a signal light.

FIG. 4 is a side view of the actuating switching device with an open face showing basic parts thereof.

FIG. 5 is the diagrametric view showing the general connected arrangement of the switching contacts and extended connections to the signal lamps.

FIGS. 6a and 6b are the side and top views of electrical lead numeral 8.

FIGS. 7a and 7b are the side and top views of a reactionary bar 22.

FIGS. 8a and 8b are the side and top views of a stationary rod 11.

Figure 1:
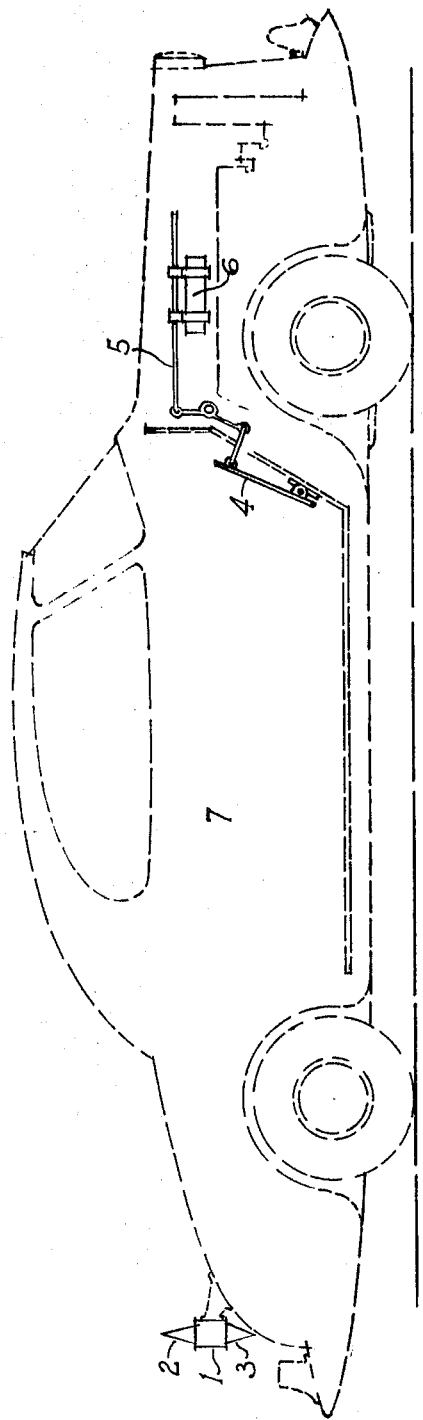
FIG. 1 is a side view of a typical automobile profile dotted outline, with a signal lamp indicated at the rear and with an actuating switching device shown at the front, suspended from an accelerator rod.

The switching device comprises a housing 6 which has an electrical lead 8 in the form of a rod for connection to a signed light 3, which rod is affixed solid in the housing 6 and one of the contacts 14 is a part thereof. 11 is a rod movable with respect to the housing 6 and extends through the housing 6 at either end and carries upper and lower contacts and a protrusion 20, projecting generally at a right angle. The rod 11 also carries a coil expansion spring 19 which is compressed and extends from the inside of the housing 6, to the protrusion 20, and being wrapped around the rod 11. An end 18 of the rod 11 is a hook for a solid attachment to a universal bracket (not shown). The end 9 of the rod 11 is used for electrical connection to an ignition switch. The reactionary bar 22 is situated directly below the rod 11 and extends through the housing 6 at either end. It is an opened face U-shaped channel with a conductive lead 17 used for connection to a signal light 2 and a lead 10 used for connection to a signal light 1. The leads 17 and 10 are fixed solid in the channel by the channel being filled with insulating material and each lead has a contact extending at a right angle to face an opposite side of the lower contact carried by the rod 11. The reactionary bar 22 has a protrusion 21 projecting at a right angle as shown in FIGS. 7a and 7b. A drag spring 13 is seated in the housing 6 and presses against a bottom portion of the reactionary bar 22 so that the bar 22 cannot be moved without sufficient force to ensure firmness of contact at contact points 15 and 16. A reflex lever 12 is pivotally supported by the housing 6 and positioned perpendicularly and resting against the stationary bar 11 and the reactionary bar 22 between the protrusions 20 and 21. The function of the reflex lever 12 is to center the contact points 15 and 16 when the contact points 14 are in the contacting position.

Figure 2:
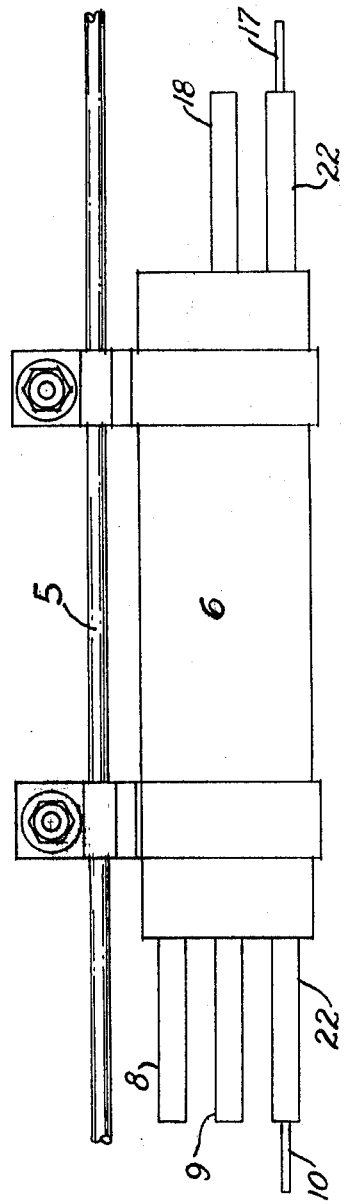
FIG. 2 is a side elevation of the actuating switching device shown suspended from accelerator rod.

As shown in FIG. 4 either the housing 6 or the rod 11 can be moved with respect to each other. As shown in FIGS. 1 and 2, the switch box is attached to the accelerator rod 5 and moves therewith. In this case the rod 11 would be stationary with respect to the movement of the switch box 6 since the end 18 would be anchored solid to a universal bracket (not shown).

The system is grounded at the signal lamps and is electrically energized through the ignition switch and operates as follows:

As the ignition is turned on, the stationary rod 11 is energized through the end 9. THe expansion of spring 19 pushes firmly against the protrusion 20 which in turn presses against the reflex lever 12 to the protrusion 21 and causes contact points 15 and 16 to remain open and at the same time resulting in the firm closing of the contact points 14 and the illumination of the signal light 3 by the current flow through the end 8 indicating that the ignition is on, and the operator does not have any pressure applied to an accelerator pedal 4.

Since the switching device is attached to an accelerator 5 and the stationary rod is anchored at its end 18, the depression of the accelerator pedal 4 by the operator causes the opening of the contact points 14, the compression of the expansion spring 19, and the closing of the contact points 16. The closing of the contact points 16 causes electrical current flow through the end 9, contact points 16, the lead 17 and the signal light 2. Hence the signal light 3 goes out and the signal light 2 is illuminated, indicating that the vehicle is accelerating.

If the pressure is backed off on the accelerator pedal 4 after the desired speed is attained by the operator, the switching device is correspondingly moved in the reverse direction since it is fastened to the accelerator rod 5, with the exception of the rod 11 which remains stationary since it is anchored at the end 18. Due to the drag spring 13 pressing against the bottom of the reactionary bar 22, the reactionary bar 22 will follow the direction of the movement of the housing 6. As such, when the switching device reverses direction of its movement the contact points 16 are opened hence the signal light 2 goes out, and the contact points 15 are closed causing the circuit to be completed through the lead 10 to the signal light 1 hence illuminating the light 1. The instant change of the light 2 going out and the signal light 1 illuminating indicates that the vehicle had just decelerated. Thereafter, if the signal light remains illuminated it indicates that the vehicle is going at an even rate of speed or a gradually diminishing rate of speed.

The aforementioned action described involving the contact points 15 and 16 and the signal lights 1 and 2 can be repeated as many times as the accelerator pedal reverses direction from approximately the first thirty-second of an inch of motion to the full extent of the thrust of the accelerator rod 5, resulting in the signal lamps indicating whether the vehicle is either accelerating or proceeding at an even rate of speed from 5 miles an hour throughout the full range of the accelerator system.

Once the pressure is entirely removed from the accelerator pedal 4, the accelerator rod 5 and the switching device will move toward the anchored end 18 of the stationary bar 11. After the housing has moved back to its original position, the expansion spring 19 exerts pressure on the protrusion 20 causing the reflex lever 12 to bear against the protrusion 21 and to force the reactionary bar 22 to move back to its original position. This causes the closing of the contact points 14 and breaking of the contact points 15. Hence, the signal light 1 goes out and the signal light 3 is illuminated indicating that the operator has removed all pressure from the accelerator pedal 4.

I claim:

1. An electrical switching device comprising: a housing carrying a contact, a movable rod extending through said housing and carrying a first set of contacts and having first protrusion thereon; a coil spring carried by said rod and extending between a side of said housing and said protrusion, a reactionary bar having a second protrusion thereon and carrying a second set of contacts and positioned for movement from a starting position with respect to said housing, a drag spring mounted in said housing and contacting said reactionary bar to provide firmness at contact points of said second set of contacts, a reflex lever pivotally mounted within said housing and extending between said first and second protrusions; said switching device being operative such that during switching operation the reactionary bar is moved from its starting position while the contacts are selectively opened and closed, and upon termination of the selective opening and closing of said contacts the reactionary bar is automatically returned to its starting position by the action of said spring releasing stored energy and causing pivoting of said lever.

2. An electrical switching device as defined in claim 1 wherein said housing is rectangular.

3. An electrical switching device as set forth in claim 1, wherein said housing is adapted for mounting on an accelerator rod and the contacts adapted to be electrically connected in a circuit to operate three-signal lamp warning device mounted at the rear of a vehicle.